United States Patent [19]
Gillett et al.

[11] Patent Number: 5,197,644
[45] Date of Patent: Mar. 30, 1993

[54] FILM CABINET WITH ROLLER ATTACHMENT AND FILM TRANSFER MECHANISMS

[75] Inventors: Jack J. Gillett, Canoga Park, Calif.; John A. Outten, St. Cloud, Fla.

[73] Assignee: The Walt Disney Company, Burbank, Calif.

[21] Appl. No.: 652,300

[22] Filed: Feb. 5, 1991

Related U.S. Application Data

[60] Division of Ser. No. 622,384, Nov. 30, 1990, abandoned, which is a continuation of Ser. No. 277,340, Nov. 29, 1988, abandoned.

[51] Int. Cl.$^5$ ............................................. B65H 75/00
[52] U.S. Cl. .................................... 226/118; 226/189; 226/199; 312/209.1
[58] Field of Search .............. 226/118, 119, 189, 195, 226/196, 43, 44, 199; 242/55.01, 205; 134/64 R; 312/20, 41; 403/328, 327, 325, 354

[56] References Cited

U.S. PATENT DOCUMENTS

| | | | |
|---|---|---|---|
| 939,350 | 11/1909 | Thompson | 242/55.01 |
| 1,654,723 | 1/1928 | Ybarrondo | 226/118 X |
| 2,133,109 | 10/1938 | Munson | 226/189 |
| 3,049,309 | 8/1962 | Miller | 226/118 X |
| 3,680,803 | 8/1972 | Takata | 242/55.01 |
| 3,734,368 | 5/1978 | Kudelski | 226/195 X |
| 3,747,863 | 7/1973 | Klementz et al. | 242/47.08 |
| 3,949,655 | 4/1976 | Gold | 226/44 X |
| 4,141,480 | 2/1979 | Calzini | 226/119 X |
| 4,215,827 | 8/1980 | Roberts et al. | 226/118 X |
| 4,367,020 | 1/1983 | Vowles | 242/55.01 X |
| 4,389,135 | 6/1983 | Peters | 403/379 X |
| 4,913,610 | 4/1990 | Olivieri | 403/328 X |

Primary Examiner—Daniel P. Stodola
Assistant Examiner—Paul Bowen
Attorney, Agent, or Firm—Pretty, Schroeder, Brueggemann & Clark

[57] ABSTRACT

A film cabinet for storing and moving a continuous loop of film. The cabinet includes parallel rows of free-spinning rollers connected to the floor and ceiling of the cabinet, and a row of drive sprockets adjacent to the ceiling having teeth for engaging the perforated edges of the film. The film is moved throughout the cabinet around the free-spinning rollers by rotation of the single row of drive sprockets. The film also may be wound around at least one tension roller having a mercury activated switch adapted to disconnect power to the drive sprockets upon film breakage inside the cabinet. Transfer of the film between the cabinet and projector is accomplished by a directionally adjustable film transfer mechanism that ensures proper bending and twisting of the film during this transfer. Other aspects include a quick connect-disconnect roller attachment mechanism, and film guides located in the cabinet to prevent sagging of the film as it traverses, for example, the floor and ceiling of the cabinet.

12 Claims, 5 Drawing Sheets

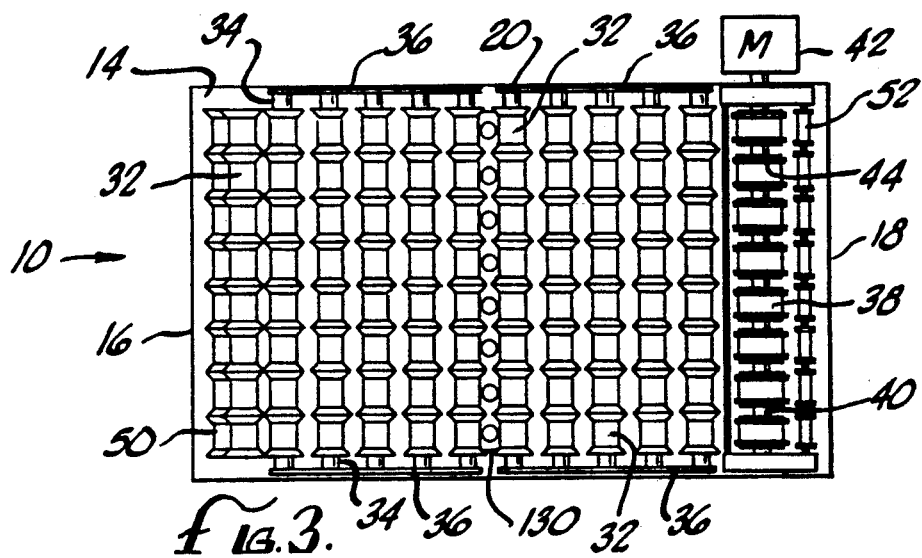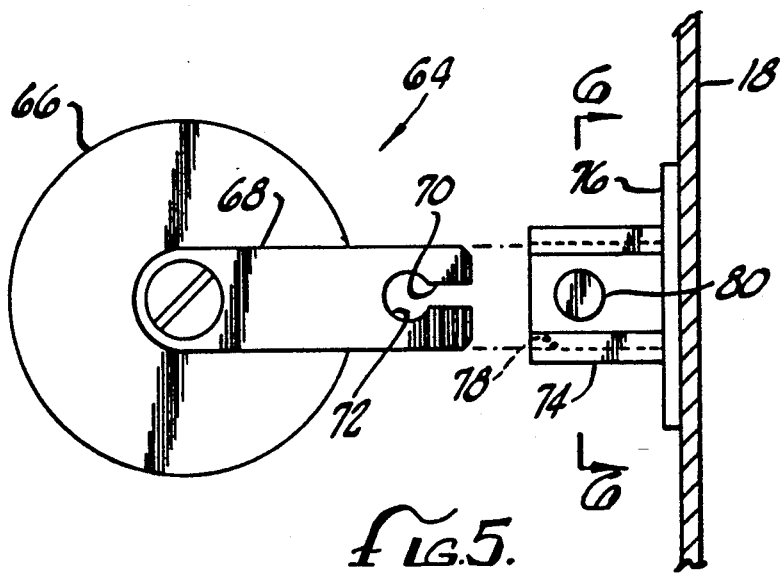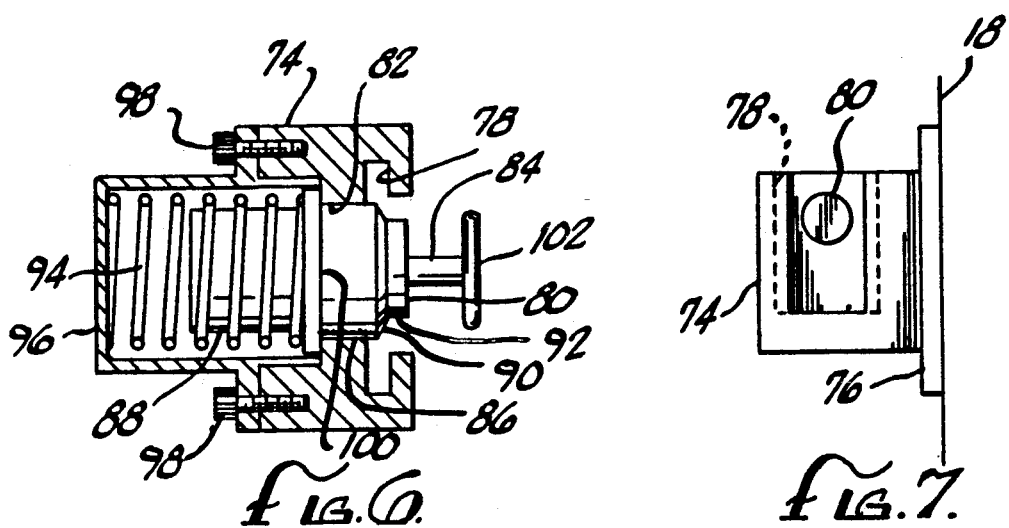

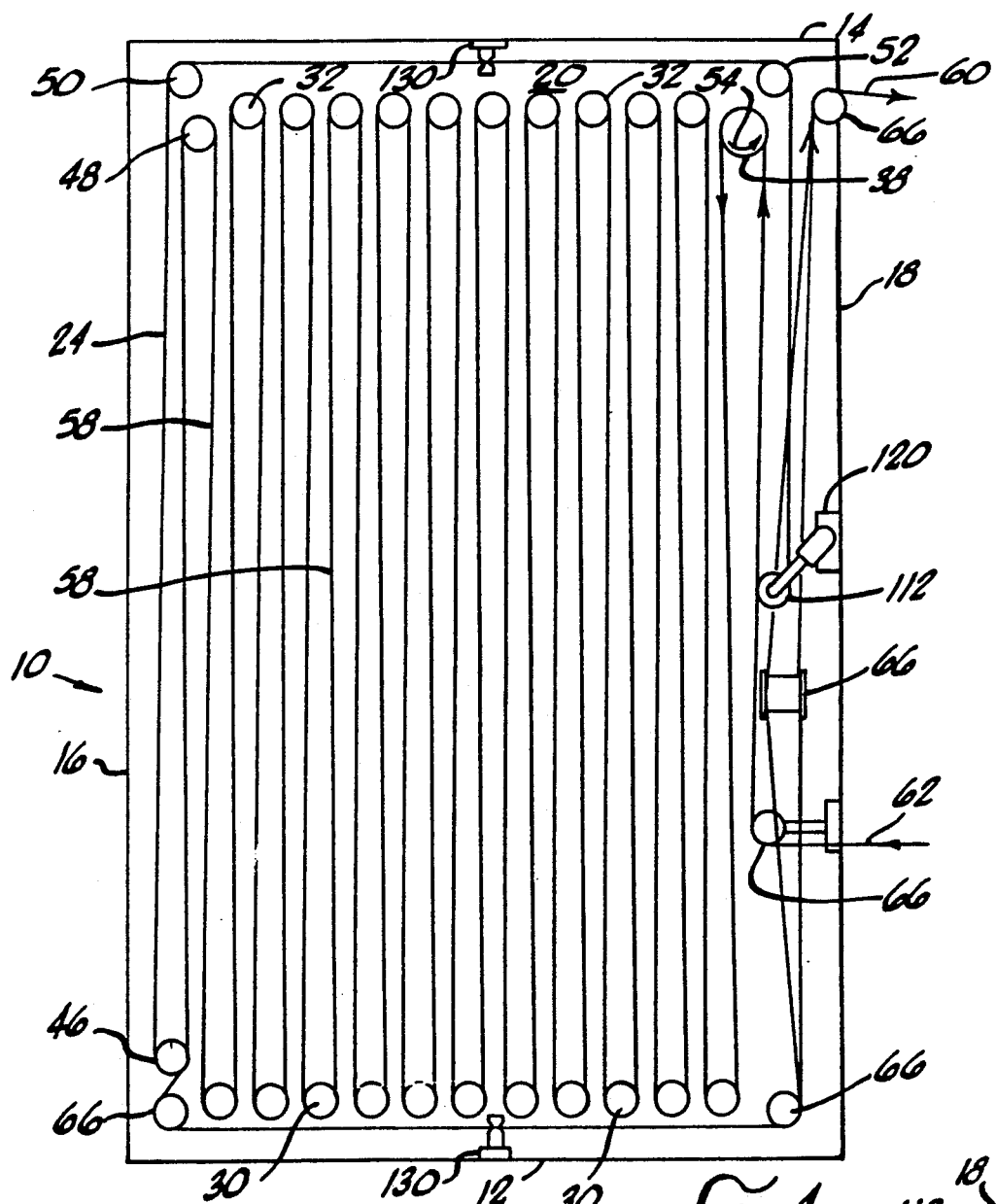
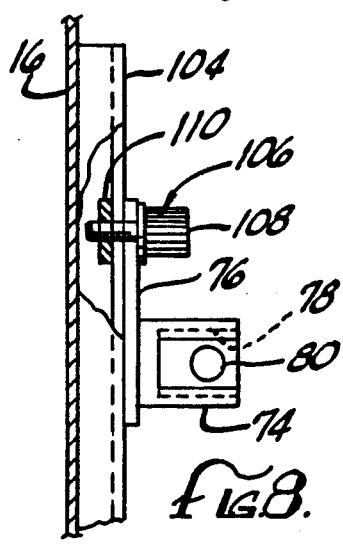
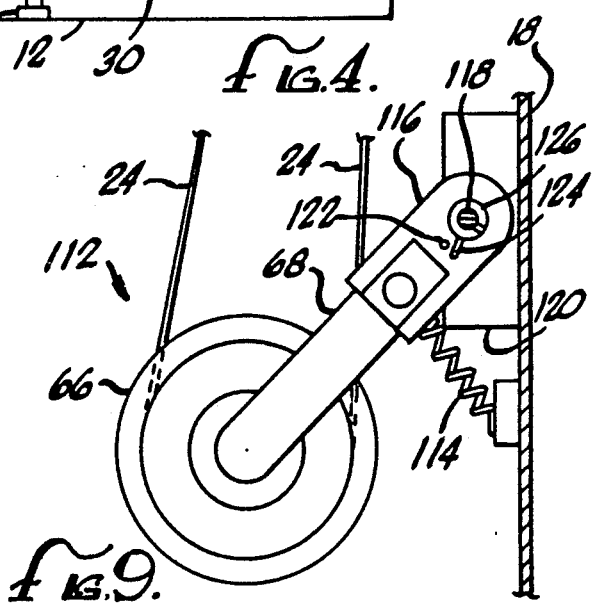
fig.4.
fig.8.
fig.9.

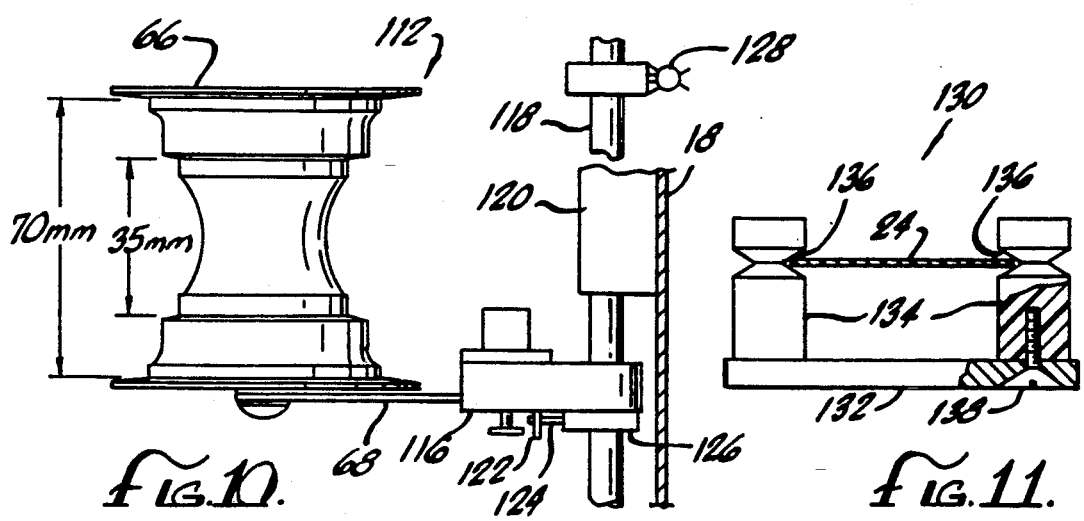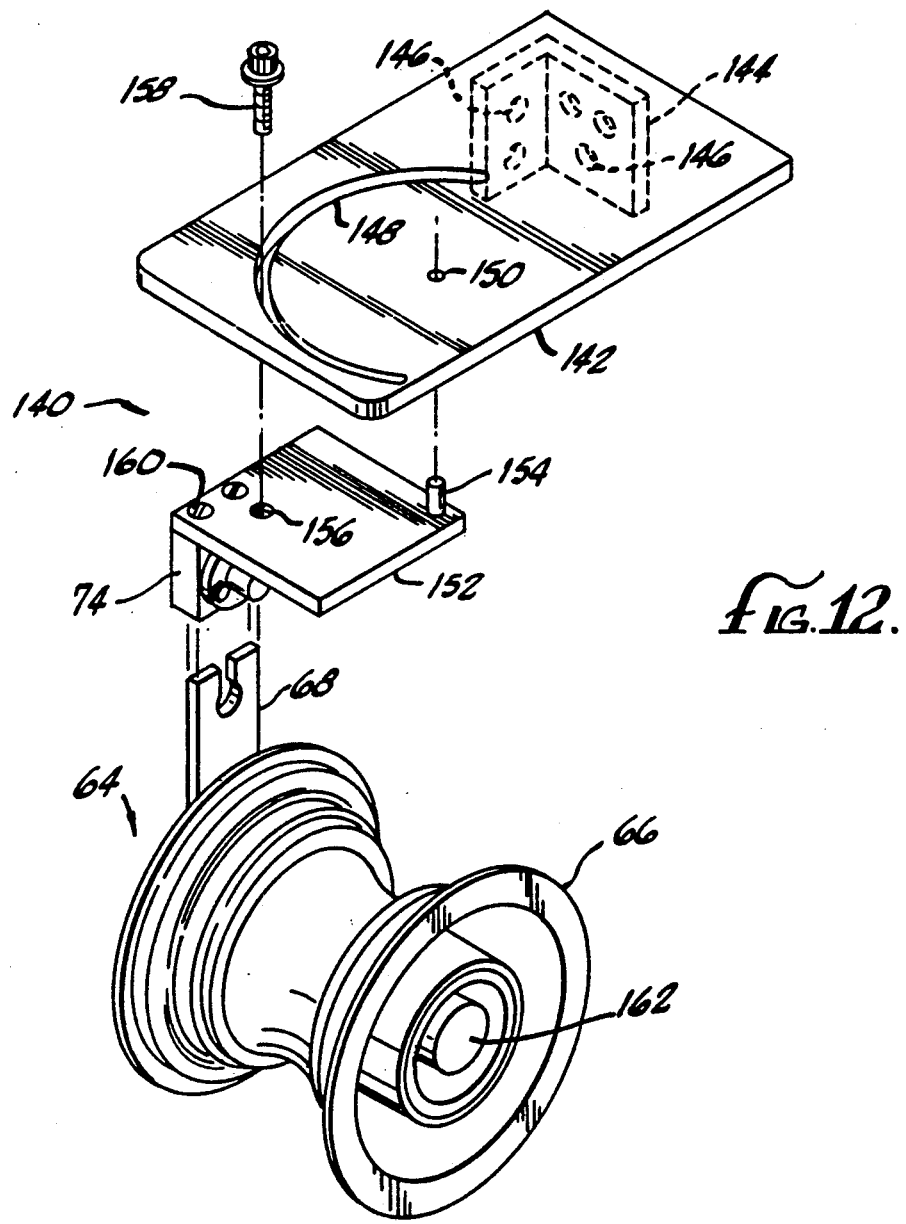

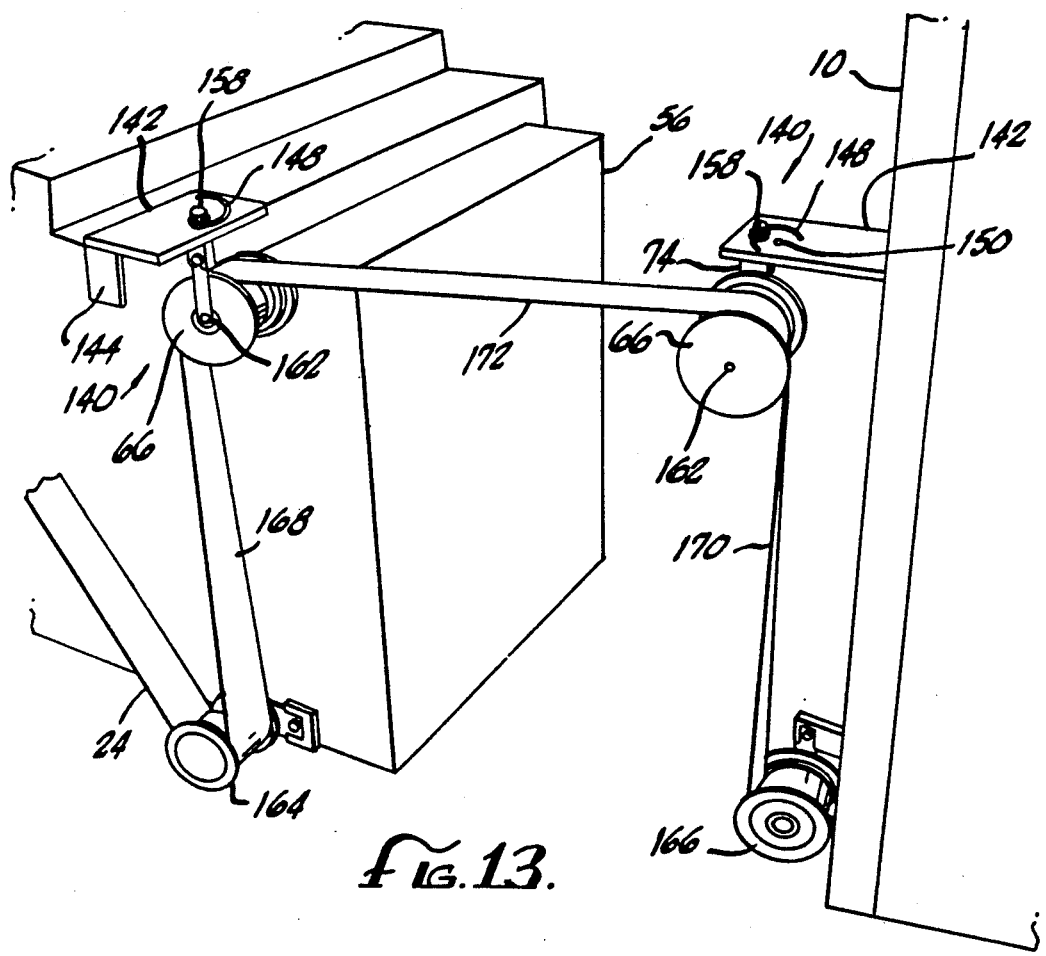

FILM CABINET WITH ROLLER ATTACHMENT AND FILM TRANSFER MECHANISMS

This application is a division of application Ser. No. 622,384 filed Nov. 30, 1990, which is a continuation of application Ser. No. 277,340 filed Nov. 29, 1988, both of which are now abandoned.

BACKGROUND OF THE INVENTION

This invention relates to film cabinets and, more particularly, to a film cabinet for storing and moving continuous loop film.

For many years, film has been stored on reels that rotate to unwind the film for feeding through a projector and subsequent rewinding onto a take-up reel. This reel-to-reel system of film transport though the projector generally has been regarded as satisfactory for feature length films shown a few times per day. However, when the film length is only several hundred feet and the film is shown continuously many times a day, such as in theaters, amusement parks and theme park attractions, for example, the reel-to-reel system has not been satisfactory. Perhaps the biggest drawback with these systems is the labor costs and time required to rewind and rethread the film. Furthermore, the film must be wound on top itself as the take-up reel pulls the film through the projector. This applies stresses to the film and frictional forces between overlapping strips of film that cause undue wear of the film. As a consequence, the film wears out very quickly, resulting in poor film quality and requiring frequent film replacement. This can be very expensive. Other disadvantages of the reel-to-reel system include the fact that the length of film that can be stored on the reel is limited by the size of the projector and diameter of the reel. If more than one reel is required to store the film, then two projectors are required to make a smooth transition from one reel to the next without interruption of the show or image projected. Rewinding of the film also is required, creating further wear.

To solve the problems associated with reel-to-reel storage and use of film, such as those described above, continuous loop film cabinets have been developed. These cabinets are designed to store and move a continuous loop of film throughout the cabinet, through a projector external to the cabinet, and then back to the cabinet itself. Because the film is in the form of a continuous loop, it never is wound on top of itself. Instead, the film is wound around rollers positioned at predetermined locations throughout the cabinet and driven around the rollers by a plurality of drive sprockets having teeth for engaging the perforated edges of the film. This substantially reduces premature film wear and maintains film quality for a much longer time than reel-to-reel systems. Moreover, excessive film length usually is not a problem, because the cabinets can be made relatively large and, if necessary, several cabinets may be employed back-to-back to store and move the continuous loop film through the cabinets and the projector.

While the continuous loop film cabinets are a big improvement over reel-to-reel film systems in continuous run applications, they are not without their own drawbacks. A typical film cabinet is about four feet wide, six feet tall and several feet deep. Thus, one significant drawback is that the cabinets are quite large, and sometimes several cabinets must be employed to store one loop of film. This drawback is especially troublesome in projector rooms where space oftentimes is very limited.

Another fundamental problem with existing film cabinets is the manner in which the film is directed and pulled through the cabinet. For example, in one known type of film cabinet, several parallel rows of drive sprockets are connected to the ceiling of the cabinet, with a plurality of free hanging rollers positioned in parallel rows in the lower region of the cabinet to receive the lower loops of the film as they come off one drive sprocket and go to the next drive sprocket. Both the drive sprockets and the free hanging rollers are relatively large and occupy valuable space within the cabinet. Consequently, the adjacent vertical strips of film are not very close to each other, because of the relatively large diameters of the sprockets and free hanging rollers. Furthermore, since the rollers at the bottom of the cabinet are suspended by the film without bearings, and thus hang freely in the film loop, they rotate as the film moves through the cabinet. As a result, several rows of drive sprockets must be utilized to pull the film through the cabinet. This takes up a lot of cabinet space. The free hanging rollers also are prone to falling out of the loops from which they are suspended, especially during cabinet movement. This creates further undesirable problems.

Another disadvantage found in some existing film cabinets is the lack of any provision to promptly cut power to the drive sprockets in the event that the film breaks or becomes accidentally unwound inside the cabinet. Thus, if the film breaks or becomes unwound, it will still be driven by the drive sprockets until it is totally unwound. The process of repairing and rethreading the film in the cabinet is very time consuming and, if the film becomes extremely tangled or otherwise damaged, it may not be possible to reuse the film, thus resulting in undesirable film replacement expenses.

There also is a lack of an effective and simple means for directing the film from the cabinet, for example, to the projector when the two units are not precisely aligned with each other. When the alignment is off, the film must twist and bend in order to be properly fed into the projector. When the film is being run at relatively high speed, it is very important that the film transfer be accomplished in such a manner so as to prevent excessive wear, unwinding, and damage to the film.

A further consideration in all film projection systems is the ease of maintenance and repair of the system. In the prior art film cabinet discussed above, there are several undesirable features which create difficulty in maintenance and repair. For example, the rows of drive sprockets in one known cabinet are rotated in unison by a lubricated chain drive system that tends to drip lubricant on the film and is messy, expensive and difficult to maintain. The continual cleaning, relubrication, checking of chain tension and other attention to the chain drive system makes it a maintenance nightmare. Film wear through various sources, such as the projector gate and elsewhere in the cabinet, creates a fine powder that is attracted to the film by static electricity from film movement in the cabinet. Airborne dirt from several other sources, including the rollers and other moving parts in the cabinet, also is attracted to and builds up on the film and produces what resembles a black snowstorm when the film is viewed on a screen. The labor and expense to clean the film and cabinet to maintain the quality of the image projected on the screen can be enormous. This also is due in large part to the fact that the rollers and other components of the cabinet are inconvenient and difficult to remove. The static electricity also causes the vertical strips of film to be attracted to each other, thus requiring further spacing between the strips and a waste of valuable cabinet space.

Accordingly, there has existed a definite need for a film cabinet that can store and move the maximum amount of film in the smallest space possible. There also has existed a need for a film cabinet that minimizes film damage if the film breaks or becomes unwound during operation, and that enables reliable high speed transfer of film between cabinets or between the cabinets and the projector or other device. Furthermore, there has existed a need for a film cabinet that is reliable in operation and simple and inexpensive to maintain. The present invention satisfies these needs and provides further related advantages.

SUMMARY OF THE INVENTION

The present invention provides a film cabinet for storing and moving a continuous loop of film in the least amount of space possible. This space saving feature is provided by a plurality of parallel rows of free-spinning rollers connected to the ceiling and floor of the cabinet, and a single row of drive sprockets in the cabinet for engaging and moving the film throughout the cabinet around the free-spinning rollers. The rows of free-spinning rollers are spaced close together and have their individual rollers aligned with the drive sprockets, thereby enabling each drive sprocket in the row to move the film around the rollers which are aligned with it. Furthermore, the film cabinet of this invention is intended to be simple in construction, reliable in use and inexpensive to maintain.

The film cabinet comprises a cabinet housing having a ceiling, a floor, two sidewalls, a back wall and a pair of doors that open and close to provide access to the front of the cabinet. The ceiling and the floor of the cabinet have a plurality of closely spaced, parallel rows of free-spinning rollers upon which the film is wound from the floor to the ceiling in vertical loops. The rollers comprising each row are connected to a shaft for common rotation with each other. A single row of drive sprockets also are connected to an upper corner of the cabinet where the ceiling and one sidewall intersect. Each of the individual drive sprockets in the row has teeth for engaging the perforated edges of the film and is connected to a shaft for common rotation. The free-spinning rollers in each row are in line with a respective drive sprocket, so that each drive sprocket pulls a portion of the film around the rollers that are aligned with it.

Several advantages result from the foregoing cabinet structure. One significant advantage is that utilization of closely spaced rows of free-spinning rollers and of only one row of drive sprockets allows the maximum amount of film to be stored in the cabinet. The complicated and messy chain drive systems of prior film cabinets, the troublesome free hanging rollers and other undesirable features of the prior film cabinets are totally eliminated, thus saving room and maximizing the useful space within the cabinet. The frequency and cost of cabinet cleaning and maintenance also is significantly reduced by virtue of eliminating many of the components found in the prior cabinets. Since a minimum number of drive sprockets are used, the likelihood of premature film wear is reduced and high film quality is maintained.

The film cabinet of this invention also includes a tension roller pivotally connected to a sidewall of the cabinet. The tension roller is biased downwardly toward the sidewall, either by a spring or the weight of the roller. Film may be wound around the tension roller in such a manner that the roller is pulled upwardly away from the wall in the usual manner. In the event that the film breaks or somehow becomes unwound inside the cabinet, the tension roller will pivot downwardly toward the sidewall. This activates a switch that stops the drive sprockets and prevents further unravelling of the film from the rollers. In one embodiment of the invention, the switch comprises a mercury activated switch.

Another feature of the invention is an improved roller attachment mechanism for quickly attaching and detaching individual free-spinning rollers at selected locations in the cabinet on the floor, ceiling, sidewalls or back wall. The attachment mechanism comprises an arm having one end rotatably connected to the roller and a free end having a narrow slotted entrance leading to an enlarged circular notch. A lock housing connected to the cabinet has a channel for slidably receiving the free end and a specially shaped spring biased pin that projects into the channel to fit within the notch of the free end to thereby lock the arm to the housing. The spring biased pin can be held in the retracted position manually. An additional feature of the attachment mechanism permits the housing to be releaseably connected to the cabinet to adjustably position the roller as desired.

To assist in holding and guiding the film through the cabinet, especially film strips that must traverse the floor or ceiling, film guides are utilized to prevent the film from unduly sagging and touching the floor. The film guides include a base for connection to the floor or ceiling of the cabinet, and a pair of nylon guide posts extending from the base having a pair of inwardly facing tapered slots for slidably receiving the outer edges of the film. These guides may be positioned where needed in the cabinet. Since only the edges of the film are guided by the posts, film quality is maintained and film wear minimized, particularly since the posts have a smooth nylon finish.

To transfer film from a cabinet to another location, such as the projector, it sometimes is necessary for the film to bend or twist in the event that the cabinet and projector are not precisely aligned. To accomplish this transfer, the cabinet of this invention further includes a directionally adjustable film transfer mechanism. The mechanism comprises a substantially planar base for connection to the cabinet, projector or other structure, and has a semi-circular slot with a hole corresponding to its center. A swivel plate beneath the base has a pin projecting from its upper surface that is received within the hole of the base. The swivel plate also has a hole positioned such that, when the pin is received in the base hole and the plate is rotated with respect to the base, the plate hole will be aligned with and follow the path defined by semi-circular slot. The plate is rotatably connected to the base by a fastener received within the plate hole and the semi-circular slot, thus enabling rotation of the plate with respect to the base. To transfer the film, a film roller is connected to the underside of the swivel plate by roller attachment means of the type discussed above. Importantly, the film roller is connected to the swivel plate such that, at all times during rotation of the swivel plate with respect to the base, the axis of the pin substantially intersects a plane defined by the film at the point where the film is supported by the roller. This provides for proper bending and twisting of the film during the transfer process.

The present invention also provides a method of moving film through the cabinet and includes the steps of providing a plurality of the parallel rows of free-spinning rollers on the ceiling and floor of the cabinet, and a single row of drive sprockets for engaging and moving the film. The film is wound around the drive sprockets and the free-spinning rollers of the cabinet, and then the row of drive sprockets is rotated to move the film throughout the cabinet around the free-spinning rollers. The method also includes winding the film around a tension roller pivotally connected to and biased downwardly toward one of the cabinet sidewalls, and stopping rotation of the drive sprockets when the tension roller is pivoted at a predetermined angle with respect to the cabinet sidewall.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is a plan view of the cabinet ceiling, showing a plurality of closely spaced, parallel rows of free-spinning rollers and a single row of drive sprockets;

FIG. 4 is a schematic elevational view of the cabinet illustrating one manner in which film may be wound around the free-spinning rollers and drive rollers of the cabinet;

FIG. 5 is an exploded view of a roller attachment mechanism for attaching individual rollers to the cabinet;

FIG. 6 is a cross-sectional view of the roller attachment mechanism, taken substantially along line 6—6 of FIG. 5;

FIG. 7 illustrates a variation of the roller attachment mechanism of FIG. 5;

FIG. 8 illustrates another variation of the roller attachment mechanism of FIG. 5 and includes means for adjustably positioning the attachment mechanism in the cabinet;

FIG. 9 is an elevational view of a tension roller connected to a sidewall of the cabinet;

FIG. 10 is a plan view of the tension roller of FIG. 9;

FIG. 11 is an elevational view, partly in cross-section, showing film guides for guiding film in the cabinet;

FIG. 12 is an exploded view of a directionally adjustable film transfer mechanism for transporting film from one location to another; and FIG. 13 is a perspective view showing two of the directionally adjustable film transfer mechanisms of FIG. 12 in use to transfer film from the cabinet to a projector.

DETAILED DESCRIPTION OF THE PREFERRED EMBODIMENT

Figure 1:
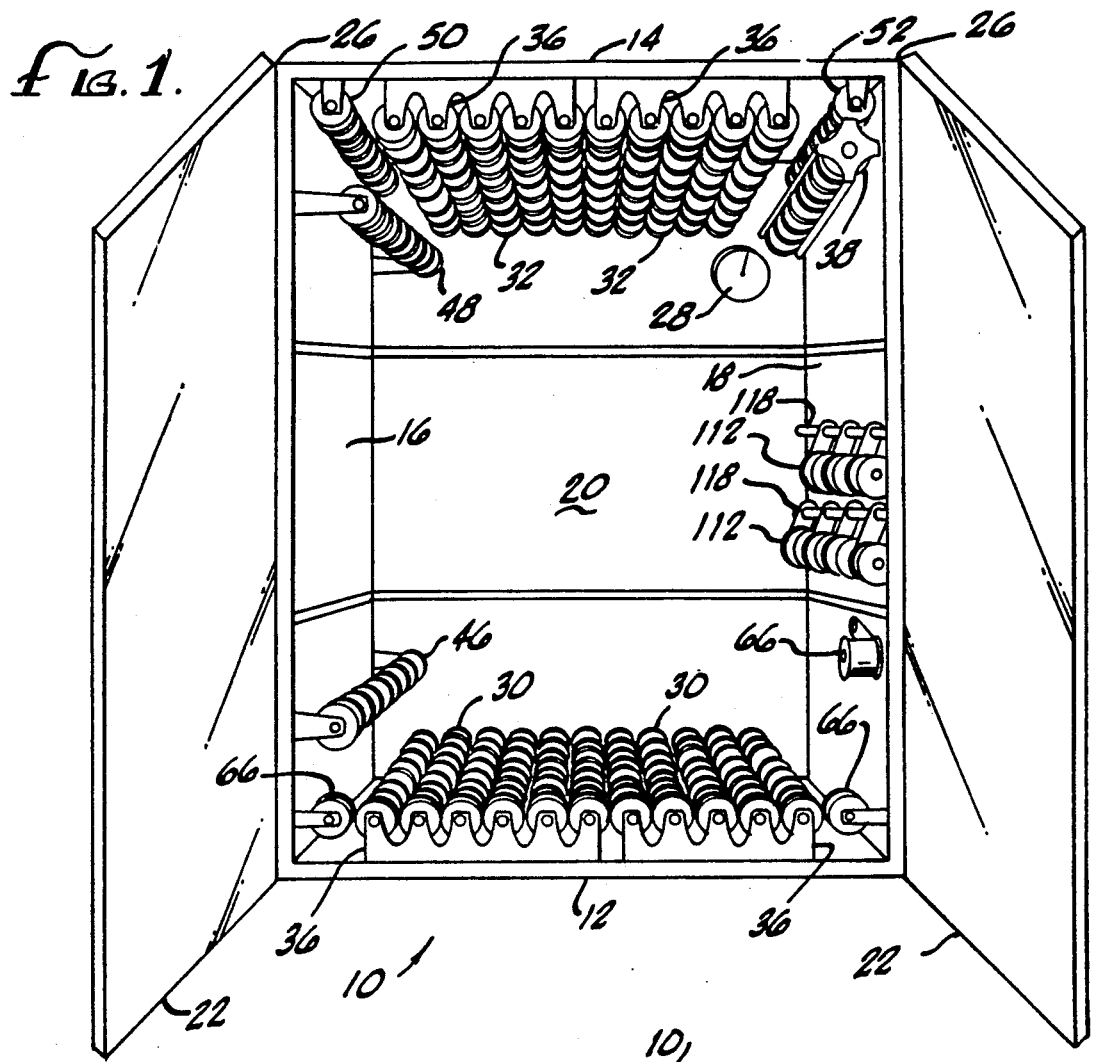
FIG. 1 is a perspective view showing the film cabinet of the present invention.
Figure 2:
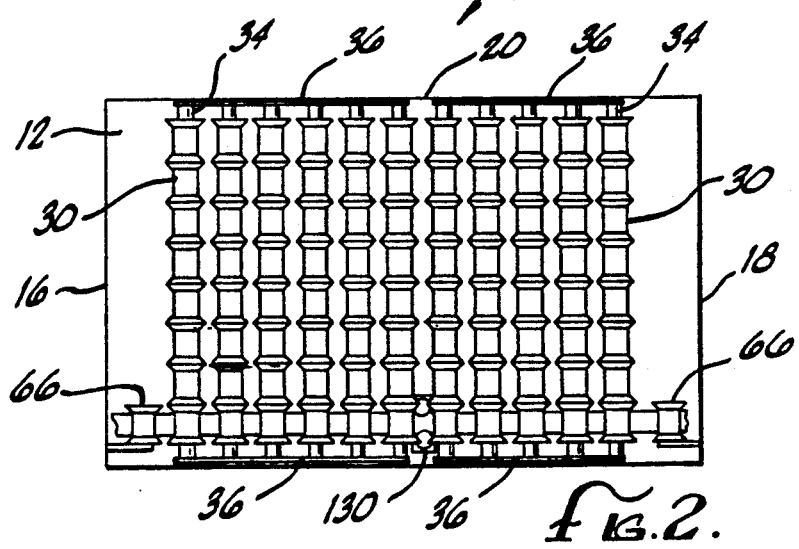
FIG. 2 is a plan view of the floor of the film cabinet, showing a plurality of closely spaced, parallel rows of free-spinning rollers.

As shown in the exemplary drawings the present invention is embodied in a film cabinet, generally referred to by the reference numeral 10, for use in storing and moving a continuous loop of film. As shown in FIG. 1, the film cabinet 10 comprises a cabinet housing having a floor 12, a ceiling 14, two sidewalls 16 and 18, a back wall 20 and a pair of doors 22 that open and close to provide access to the front of the cabinet. The film 24 (shown in FIG. 4) has been removed for purposes of clarity. The doors 22 may be connected to the sidewalls 16 and 18 by hinges 26 in the usual manner and preferably are constructed of a transparent material, such as glass, to allow visual access inside the cabinet 10 when the doors 22 are closed. The cabinet housing may be constructed from steel or similar materials. A thermometer or other temperature or humidity measuring device 28 is positioned on the back wall 20 to monitor the temperature and/or humidity inside the cabinet, which is important to prevent film damage.

In accordance with the present invention, the floor 12 of the cabinet 10 is provided with a plurality of closely spaced, parallel rows of free-spinning rollers 30 upon which the film 24 is wound. In a similar manner, the ceiling 14 of the cabinet also has a plurality of closely spaced, parallel rows of free-spinning rollers 32 adapted to receive film. The rollers 30 and 32 comprising each row of rollers on the floor 12 and ceiling 14 are joined to each other end-to-end axially along a tubular shaft 34 for common rotation with each other. Positioning the rollers end-to-end in this manner prevents dirt build up between adjacent rollers on the shaft and thereby facilitates maintenance and cleaning of the rollers. The rollers 30 and 32 in the preferred embodiment are rotatably supported on the shaft 34 by conventional bearings (not shown) and, thus, the rollers in each row advantageously rotate in unison during film movement. Since the rollers 30 and 32 are joined end-to-end, bearings are needed only at the ends of the shaft 34. This is a marked improvement over prior film cabinets utilizing individual rollers, each with its own set of bearings, which undesirably tend to accumulate dirt and require frequent cleaning.

The rollers 30 and 32 illustrated in the drawings are of a size adapted to receive 70 mm film, but also can receive 35 mm film. When using 70 mm film rollers in the cabinet 10, there preferably are about eight rollers 30 and 32 on each shaft 34. When using smaller 35 mm film rollers, more of them may be placed on each shaft. Thus, when using 35 mm film rollers, there preferably are about fifteen rollers 30 and 32 on each shaft 34. Consequently, more film 24 can be stored in a cabinet utilizing 35 mm rollers. Nevertheless, the space saving construction of the present cabinet still allows maximum storage of film for both 35 mm, 70 mm and other film sizes.

The roller shafts 34 are rigidly connected at their outer ends to scalloped brackets 36 secured to the floor 12 and ceiling 14 of the cabinet 10. The shafts 34 preferably are releaseably connected to the brackets 36 so that they may be easily connected to and disconnected from the brackets for cleaning and cabinet maintenance. For example, if a row of rollers is removed for cleaning, a replacement row of rollers may be conveniently substituted to replace the row being cleaned. If there is any film 24 in the cabinet 10, it need not be removed since the replacement rollers will be identical and, thus, interchangeable, so that they may be simply positioned to engage the film as the rollers are being substituted This dramatically reduces maintenance time and costs.

The film 24 is moved throughout the cabinet 10 around the free-spinning rollers 30 and 32 by a row of drive sprockets 38. Similar to the free-spinning rollers, the drive sprockets 38 are positioned end to end axially along a drive shaft 40. Each drive sprocket 38 is secured to the shaft 40 so that rotation of the shaft rotates the drive rollers in unison. The shaft 40 preferably is rotated synchronously by the projector motor driving the projector film sprocket (not shown). If necessary, conventional universal and angle drive mechanisms (also not shown) may be used to connect the projector motor to the shaft 40. It is understood, however, that other drive mechanisms for rotating the shaft 40 may be used, such as an external motor 42 synchronized with the projector motor. A crank (not shown) also may be provided to manually rotate the drive sprockets 38 when the motor clutch is disengaged. Each of the drive sprockets 38 also has teeth 44 for engaging the perforated edges of the film 24 and moving the film throughout the cabinet 10 around the free-spinning rollers 30 and 32. As for location in the cabinet 10, the row of drive sprockets 38 preferably is connected to an upper corner of the cabinet where the ceiling 14 and either the left or the right sidewall 16 or 18 intersect. In the preferred embodiment, the drive sprockets 38 are connected to the cabinet sidewall 18 just beneath a row of free-spinning rollers 32 connected to the cabinet ceiling 14.

Alignment of the free-spinning rollers 30 and 32 and drive sprockets 38 results in the use of only a single row of drive sprockets to move the film 24 throughout the cabinet 10. As shown in FIG. 3, the rows of free-spinning rollers 32 on the ceiling 14 are positioned parallel to the row of drive sprockets 38. These rows of rollers 32 on the ceiling 14 are, in turn, positioned parallel to the rows of free-spinning rollers 30 on the floor 12. Furthermore, the free-spinning rollers 32 in each row on the ceiling 14 are transversely aligned with a respective drive sprocket 38. Similarly, the free-spinning rollers 30 in each row on the floor 12 are in line with a respective free-spinning roller 32 on the ceiling 14 and, thus, in line with a respective drive sprocket 38. As a result, each drive sprocket 38 pulls a portion of the film loop around the rollers 30 and 32 that are aligned with it.

Other rows of free-spinning rollers 46, 48, 50 and 52 may be connected to the cabinet ceiling 14 and sidewall 16 for properly directing the film 24 throughout the cabinet 10 as desired. In actual use, the rows of rollers 50 and 52 at the top left and top right of the film cabinet 10, respectively, are angled slightly to allow the film 24 to cross-over in the cabinet from one drive sprocket to the next and allow proper threading of the film throughout the cabinet. For purposes of clarity, however, these rollers 50 and 52 are illustrated as being parallel to the ceiling rollers 32.

Referring to FIG. 4, one manner is illustrated for winding the film 24 around the free-spinning rollers 30 and 32 and the drive sprockets 38 of the film cabinet 10. The direction of rotation of the drive sprockets 38 is indicated by the curved arrow 54. In this regard, it is noted that the drive sprockets 38, in essence, pull the film 24 around virtually all of the free-spinning rollers 30 and 32 in the cabinet 10, leaving only a small section of film 24 that must be pulled out of the cabinet by the projector 56 (FIG. 13) and returned. In the trade, the length of film 24 between any two drive sprockets 38 is known as a film loop 58. The length of film between the last cabinet drive sprocket and the projector is known as the feed loop 60, and the length of film between the projector and the first cabinet drive sprocket is known as the return loop 62. Since the film loop 58 between each drive sprocket 38 is not unduly lengthy, only a single row of drive sprockets is necessary to pull the film through the cabinet.

Proper positioning of the free-spinning rollers 3 and 32 on the floor 12 and ceiling 14 of the cabinet 10 is important to maximize the amount of available space in the cabinet that can be used for winding film 24. Proper spacing of the vertical strips of each film loop 58 also is important, because they must be far enough apart to prevent attraction to each other caused by the build up of static electricity from film movement in the cabinet 10. With these concerns in mind, it is noted from FIG. 4 that the free-spinning rollers 32 on the ceiling 14 do not have their shafts 34 in precise vertical alignment with the shafts 34 of the free-spinning rollers 30 connected to the floor 12. Instead, the rollers 30 and 32 of the floor 12 and ceiling 14 are offset slightly with respect to each other so that instead of a vertical film strip extending parallel to the cabinet sidewalls 16 and 18 as it comes off a ceiling roller 32 it is angled slightly to one side as it extends down toward around the floor roller 30. This provides proper spacing between the vertical strips of each film loop 58 and advantageously permits packing of the film 24 in a high density manner, thereby maximizing the amount of useful space within the cabinet 10 for film storage and movement. Since the film 24 is not as easily pulled sideways by static charge as it approaches the floor and ceiling rollers 30 and 32, these rollers still may be closely spaced together Utilization of the closely spaced rows of free-spinning rollers 30 and 32 o the floor 12 and ceiling 14 of the cabinet 10 allow the maximum amount of film 24 to be stored in the cabinet. Utilization of only a single row of drive sprockets 38 saves additional space and, furthermore, totally eliminates the necessity of a complicated and messy chain drive system for synchronous rotation of several rows of such drive sprockets, as used in prior film cabinets. Also eliminated are the troublesome free-hanging rollers, which occupy significant space due to their size and proneness to movement within the cabinet and, sometimes, falling out of the loop from which they are suspended. The likelihood of premature film wear also is reduced, and the likelihood of high film quality maintained, since only a single row of drive sprockets 38 is utilized. The cabinet 10 may be moved around without fear of its components falling out of their proper place. Moreover, fewer cabinets may be used to hold film thereby saving the usually limited amount of space in the projection room.

Another important feature of the present invention is an improved roller attachment mechanism 64 for quickly attaching and detaching individual free-spinning rollers 66 at selected locations in the cabinet 10, for example, on the floor 12, ceiling 14, sidewalls 16 and 18 or back wall 20. As shown in FIG. 5, the roller attachment mechanism 64 comprises an arm 68 having one end rotatably connected to a free-spinning roller 66, and a free end having a narrow, axially slotted entrance 70 leading to an enlarged circular notch 72 positioned inwardly from the free end. The free end of the arm 68 is releaseably connected to a lock housing 74 shown in FIG. 6. The housing 74 includes a base 76 for connection to the cabinet 10 and a channel 78 adapted to slidably receive the free end of the arm 68. The housing 74 also includes a pin 80 slidably receivable within a bore 82 of the housing extending perpendicularly to the channel 78. The pin 80 has a narrow cylindrical outer portion 84 adapted to fit within the slotted entrance 70 of the free end, an enlarged cylindrical middle portion 86 adapted to fit within the bore 82, and a cylindrical inner portion 88 projecting out of the bore 82. A tapered shoulder 90 and cylindrical stud 92 positioned between the middle portion 86 and the outer portion 84 are adapted to fit within the circular notch 72 of the free end. The pin 80 further is adapted to be moved axially within the bore 82 and transversely into the channel 78.

In the preferred embodiment, the pin 80 is biased to a normal position, in which the shoulder 90 and stud 92 are within the channel 78, by a spring 94. The spring 94 is positioned around the cylindrical inner portion 88 and within a cylindrical cap 96 connected to the housing 74 by fasteners 98. The spring also is biased between the cap 96 and an annular ledge 100 dividing the middle portion 86 from the inner portion 88. The ledge 100 has a diameter greater than the diameter of the bore 82 to prevent the pin 80 from being pushed out of the bore by the spring 94. The pin 80 also may be moved manually from the normal position to a retracted position in which only the narrow outer portion 84 is within the channel 78. In the retracted position, the spring 94 is compressed and the shoulder 90 and stud 92 are within the bore 82.

The roller attachment mechanism 64 advantageously locks the roller 66 in the same place every time and eliminates guess work by the operator on adjustments and roller positioning. Manually depressing a head 102 on the pin 80 moves it to the retracted position and enables the arm 68 to be inserted into the channel 78. When the pin 80 is released, the shoulder 90 moves into engagement with the notch 72 and securely connects the arm 68 to the lock housing 74. Normally, the stud 92 does not engage the notch 72, but it is provided as a safety feature in the event that the shoulder 90 somehow becomes disengaged from the notch 72. To disconnect the arm 68 from the housing 74, the head 102 of the pin 80 may be manually depressed until the shoulder 90 and stud 92 of the pin are completely within the bore 82 and the pin is in the retracted position. In this retracted position, only the narrow portion 84 of the pin 80 is within the channel 78 and, thus, the arm 68 may be freely removed.

FIG. 7 illustrates an alternative embodiment of the lock housing 74 of the roller attachment mechanism 64. In the previous housing embodiment discussed above in connection with FIGS. 5-6, the channel 78 is shown extending perpendicular to a cabinet sidewall 18. In FIG. 7 it is shown extending parallel to the sidewall 18. Different embodiments of the housing 74, such as those shown in FIGS. 5 and 7 may be provided to allow quick attaching and detaching of individual rollers 66 at virtually any location inside the cabinet 10. Other orientations of the channel 78 with respect to the sidewalls 16 or 18, other than the perpendicular and parallel orientations described above, may be employed to increase the versatility of the roller attachment mechanism 64, as desired.

FIG. 8 shows still another embodiment of the lock housing 74, in which the base 76 is extended on one side and is adapted to be slidably connected to the cabinet 10 to adjustably position the roller 66. To adjustably position the roller 66, an angled bracket 104 is connected to the sidewall 16, and a fastener 106 having a head 108 for engagement with the base 76 and a nut 110 positioned behind the bracket 104 permits the housing 74 to be slidably moved along the bracket to any desired location. Tightening of the fastener 106 secures the housing 74 to the bracket 104 at any desired location.

Another aspect of the film cabinet 10 of this invention includes the provision of tension rollers 112 pivotally connected to one or more sidewalls 16 and 18 of the cabinet. As shown in FIG. 1, a plurality of tension rollers 112 may be employed, and two rows of such rollers are illustrated, by way of example, connected to the sidewall 18. Each tension roller 112 is biased downwardly toward the cabinet sidewall 18, either by a spring 114 or by the weight of the roller itself. Referring to FIGS. 9-10, the tension roller 112 comprises one of the previously described free-spinning rollers 66 connected to one end of an arm 68 for receiving a loop of film 24 coming off one of the drive sprockets 38. The other end of the arm 68 is connected to a lock housing 116, similar to the lock housing 74 described above in connection with FIGS. 5-6, except that the housing 116 is pivotally connected to the sidewall 18 by a bar 118 secured to the sidewall via brackets 120. In operation, film 24 is wound around each tension roller 112 in such a manner that the roller is pulled upwardly away from the sidewall 18 causing the spring 114 to stretch, as shown in FIG. 9. One tension roller 112 may be used to keep tension on the feed loop 60 as it exits the cabinet 10 to the projector 56, while the other tension rollers 112 keep tension on the other portion of the film still traveling through the cabinet between drive sprockets 38.

In the event that the film 24 breaks or somehow becomes unwound inside the cabinet 10, such as when a film splice fails, the tension rollers 112 advantageously are provided with stop means for stopping the drive sprockets 38 during such an event. In the preferred embodiment, the stop means shown in FIGS. 9-10 comprises a finger 122 adapted to contact an arm 124 fixedly connected to the bar 118 by a collar 126. The bar 118 is biased by a spring mechanism (not shown) in a clockwise direction to a position such that the finger 122 does not contact the arm 124 during normal operation of the film cabinet 10. A mercury activated switch 128 preferably connected at one end of the bar 118 is activated by counterclockwise rotation of the bar (through contact of the finger 122 with the arm 124). Thus, if the film 24 breaks, at least one of the tension rollers 112 will pivot downwardly toward the sidewall 18 as the broken portion of the film comes off the drive sprocket 38. Extreme downward movement of the tension roller 112 in this manner causes the finger 122 to contact the arm 124 and rotate the bar 118. This in turn rotates and activates the mercury switch 128 and causes it to disconnect power to the motor 42 or other device driving the row of drive sprockets 38. This prevents further unravelling of the film 24 from the rollers inside the cabinet and substantially reduces the possibility of undue film damage or entanglement.

FIG. 11 illustrates film guides 130 that are utilized to assist in holding and guiding the film 24 through the cabinet 10, especially film strips that must traverse the floor 12 and ceiling 14. The film guides 130 include a base 132 having one side for connection to the floor 12 or ceiling 14 of the cabinet 10, and a pair of cylindrical nylon guide posts 134 extending from the other side of the base 132. The guide posts 134 are positioned parallel to each other, and each has an annular tapered slot 136 at its outer end. The slots 136 are adapted to slidably receive the outer edges of the film 24 to suspend the film above the floor 12 or across the ceiling 14 of the cabinet 10. These film guides 130 may be positioned where desired throughout the cabinet 10 to prevent the film 2 from unduly sagging or touching the cabinet floor 12, sidewalls 16 and 18, etc. For example, a row of such film guides 130 preferably are located on the cabinet ceiling 14 to suspend and guide the film 24 between the ceiling rollers 50 and 52. Since the ceiling rollers 50 and 52 are angled with respect to the other ceiling rollers 32, as discussed previously, the row of film guides 130 on the ceiling 14 also should be angled in the same manner. For purposes of clarity, however, the ceiling rollers 50 and 52 and the ceiling film guides 130 are not illustrated as being angled. Since only the edges of the film 24 are in contact with the posts 134, film quality is maintained and film wear substantially minimized. This is true particularly because the posts 134 have a smooth nylon finish with a very low coefficient of friction. The posts 134 may be connected to the base 132 by fasteners 138 or other appropriate means.

The versatility of the film cabinet 10 of the present invention is further enhanced by the provision of a directionally adjustable film transfer mechanism 140, as shown in FIGS. 12-13. To transfer film 24 from the cabinet 10 to another location, such as the projector 56, it sometimes is necessary for the film to bend or twist. Bending and twisting of the film 24 usually is required when the cabinet 10 and the projector 56 are not precisely aligned to otherwise enable the film to be directly fed in a straight line from the cabinet to the projector. The directionally adjustable transfer mechanism 140 accomplishes this twisting and bending transfer in a precise and reliable manner.

The transfer mechanism 140 comprises a substantially planar base 142 having a bracket 144 on its underside with holes 146 for connecting the base to the cabinet 10, projector 56 or other structure. The base 142 has a semi-circular slot 148 toward one end and a hole 150 through the base corresponding to the center of the semi-circular slot. A swivel plate 152 situated below the base 142 has a pin 154 projecting from its upper surface adapted to be freely and rotatably received within the base hole 150. A threaded hole 156 in the plate 152 is positioned such that, when the pin 154 is received in the base hole 150 and the plate 152 is rotated with respect to the base 142, the plate hole 156 will be aligned with and follow the path defined by the semi-circular slot 148. The swivel plate 152 preferably is joined to the base 142 by a threaded fastener 158 threadedly received within the threaded plate hole 156 and freely through the semi-circular slot 148. The fastener 158 should be in a loosened condition to permit the plate 152 to swivel with respect to the base 142 until the desired position of the plate with respect to the base has been determined. At that point, the fastener 158 may be tightened down completely to positively secure the plate 152 to the base 142. The underside of the swivel plate 152 is provided with a roller attachment mechanism 64 of the type described above in connection with FIGS. 5-6. Thus, a lock housing 74 is connected to the underside of the swivel plate 152 by screws 160 and receives the free end of an arm 68 having its other end rotatably connected to a free-spinning film roller 66.

An important feature of the directionally adjustable film transfer mechanism 140 is that the film roller 66 is connected to the swivel plate 152 in such a manner that the axis of the pin 154 substantially intersects a plane defined by the film 24 at the point where the film is supported by the roller 66. This intersection between the axis of the pin 154 and the film plane occurs at all times during rotation of the swivel plate 152 with respect to the base 142. This provides for uniform and proper bending and twisting of the film 24 during the transfer process because the centerlines of the film planes for each roller holding film are always aligned.

In FIG. 13, two transfer mechanism 140 are shown transferring film 24 from the projector 56 to the cabinet 10. As the film exits the projector 56 it moves around a free-spinning roller 164 at the base of the projector. This roller 164 directs the film upwardly to one of the film transfer mechanisms 140 connected to an upper portion of the projector 56. The film 24 then moves in a horizontal manner toward another film transfer mechanism 140 connected to an upper portion of the cabinet 10, where it thereafter is directed downwardly to a free-spinning roller 166 at the base of the cabinet and subsequently into the cabinet itself. During the transfer process, it is noted that the vertical strips 168 and 170 of the film 24 adjacent to the cabinet 10 and the projector 56 bend and twist, while the horizontal section 172 of the film 24 between the two transfer mechanisms 140 does not bend or twist. Since the centerline of the film always is aligned with and perpendicular to the axis of the pins 154, proper twisting of the vertical strips 168 and 170 of film is accomplished and the likelihood of the film coming off of the rollers during film movement is minimized.

The present invention also provides a method of moving film 24 through the cabinet 10 around the various rollers positioned inside. The method includes the steps of providing a plurality of the parallel rows of free-spinning rollers 30 and 32 on the floor 12 and ceiling 14 of the cabinet, and a single row of drive sprockets 38 for engaging and moving the film 24. The film is then wound around the drive sprockets 38 and the free-spinning rollers 30 and 32 of the cabinet 10 in a desired manner. Thereafter, the row of sprockets 38 is rotated to move the film 24 throughout the cabinet 10 around the free-spinning rollers 30 and 32. Variations of this method also may be provided, including the steps of providing a tension roller 112 pivotally connected to and biased downwardly toward one of the cabinet sidewalls 18, and then winding the film 24 around that roller 112, and stopping the rotation of the drive sprockets 38 when the tension roller 112 is pivoted at a predetermined angle with respect to the cabinet sidewall 18. Pivoting the tension roller 112 at this predetermined angle activates means for stopping the drive sprockets 38 which, in the preferred embodiment, is the mercury activated switch 128 discussed above. Again, this helps prevent total unravelling of the film 24 inside the cabinet 10 and undue entanglement should a film splice fail or other similar problem occur.

It will be appreciated from the foregoing that the present invention provides a film cabinet 10 having a plurality of closely spaced free-spinning rollers 30 and 32 connected to the floor 12 and ceiling 14 of the cabinet 10, and a single row of drive sprockets 38 for engaging and moving the maximum amount of film throughout the cabinet in the least amount of space. In the event of film breakage, a spring-biased tension roller 112 pivots downwardly and activates a mercury switch 128 to disconnect power to the drive rollers 38, thereby minimizing film damage and entanglement. Convenient roller attachment means 64, film guides 130 and a versatile directionally adjustable film transfer mechanism 140 provide further desirable features.

While a particular form of the invention of the invention has been illustrated and described, it will be apparent that various modifications can be made without departing from the spirit and scope of the invention. Accordingly, it is not intended that the invention be limited, except as by the appended claims.

We claim:

1. A film cabinet, comprising:
   (a) a cabinet housing having a floor, a ceiling and sidewalls extending substantially from the floor to the ceiling;
   (b) a plurality of rollers connected to the housing for transporting film through the cabinet;
   (c) drive means for engaging the film and moving it through the cabinet around the rollers;
   (d) tension means for applying tension to the film; and
   (e) roller attachment means for attaching the rollers to the cabinet housing, the roller attachment means comprising:
   an arm having one end rotatably connected to the roller and a free end having a narrow slotted entrance leading to an enlarged notch positioned inwardly from the free end;
   a housing having a base for connection to the cabinet, and a channel adapted to slidably receive the free end of the arm and prevent pivoting of the arm with respect to the housing; and
   a pin slidably receivable within a bore of the housing having a narrow outer portion adapted to fit within the slotted entrance of the free end and an enlarged inner portion adapted to fit within the notch of the free end, the pin being movable in the bore transversely into the channel from a normal portion in which the enlarged inner portion is within the channel to a retracted position in which only the narrow outer portion is within the channel.

2. The film cabinet of claim 1 wherein the pin is biased to the normal position by a spring.

3. The film cabinet of claim 1, wherein the base is slidably connected to the cabinet to adjustably position the roller.

4. The film cabinet of claim 1, further comprising a directionally adjustable film transfer mechanism for transferring film from the cabinet, the film transfer mechanism having
   (a) a substantially planar base for connection to the cabinet and having a semi-circular slot and a hole corresponding to the center of the semi-circular slot;
   (b) a swivel plate having
   a pin projecting from its upper surface adapted to be rotatably received within the hole of the base, and
   a hole positioned such that, when the pin is received in the base hole and the plate is rotated with respect to the base, the plate hole will be aligned with and follow the path defined by the semi-circular slot;
   (c) a fastener received within the plate hole and the semi-circular slot for connecting the plate to the base and enabling rotation of the plate with respect to the base until the fastener is tightened to secure the plate to the base; and
   (d) a film roller connected to the swivel plate such that the midpoint of the rotational axis of the roller is aligned with and perpendicular to the axis of the pin during rotation of the swivel plate with respect to the base.

5. The film cabinet of claim 4 wherein the roller of the directionally adjustable film transfer mechanism is connected to the swivel plate by roller attachment means.

6. A film roller attachment mechanism for attaching a roller to a film cabinet, comprising:
   (a) an arm having one end rotatably connected to the roller and a free end having a narrow slotted entrance leading to an enlarged notch positioned inwardly from the free end; and
   (b) a housing having
   a base for connection to the cabinet,
   a channel adapted to slidably receive the free end of the arm and prevent pivoting of the arm with respect to the housing, and
   a pin slidably receivable within a bore of the housing having a narrow outer portion adapted to fit within the slotted entrance of the free end and an enlarged inner portion adapted to fit within the notch of the free end, the pin being movable in the bore transversely into the channel from a normal position in which the enlarged inner portion is within the channel to a retracted position in which only the narrow outer portion is within the channel.

7. The roller attachment mechanism of claim 6, wherein the pin is biased to the normal position by a spring.

8. The roller attachment mechanism of claim 6, wherein the base is slidably connected to the cabinet to adjustably position the roller.

9. A film roller attachment mechanism for attaching a roller to a film cabinet, comprising:
   (a) an arm having one end rotatably connected to the roller and a free end having a narrow slotted entrance leading to an enlarged notch positioned inwardly from the free end;
   (b) a housing having a base for connection to the cabinet, and a channel adapted to slidably receive the free end of the arm and prevent pivoting of the arm with respect to the housing; and
   (c) a pin slidably receivable within a bore of the housing having a narrow outer portion adapted to fit within the slotted entrance of the free end and an enlarged inner portion adapted to fit within the notch of the free end, with a tapered portion providing a transition between the outer portion and the inner portion, the pin being movable in the bore transversely into the channel from a retracted position, in which only the narrow outer portion is within the channel, to an extended position, in which the tapered portion engages the notch and connects the arm to the housing.

10. A directionally adjustable film transfer mechanism for transferring film from one location to another, comprising:
   (a) a substantially planar base for connection to a structure and having a semi-circular slot and a hole corresponding to the center of the semi-circular slot;
   (b) a swivel plate having a pin projecting from its upper surface adapted to be received within the hole of the base, and a hole positioned such that, when the pin is received in the base hole and the plate is rotated with respect to the base, the plate hole will be aligned with and follow the path defined by the semi-circular slot;

(c) a fastener received within the plate hole and the semi-circular slot for connecting the plate to the base and enabling rotation of the plate with respect to the base until the fastener is tightened to secure the plate to the base; and (d) a film roller connected to the swivel plate such that, at all times during rotation of the swivel plate with respect to the base, the axis of the pin substantially intersects a plane defined by the film at the point where the film is supported by the roller.

11. The directionally adjustable f--m transfer mechanism of claim 10, wherein the roller is connected to the swivel plate by roller attachment means.

12. The directionally adjustable film transfer mechanism of claim 11, wherein the film attachment means comprises:

(a) an arm having one end rotatably connected to the roller and a free end having a narrow slotted entrance leading to an enlarged notch positioned inwardly from the free end; and (b) a housing having a base for connection to the swivel plate, a channel adapted to slidably receive the free end of the arm, and a pin slidably receivable within a bore of the housing having a narrow outer portion adapted to fit within the slotted entrance of the free end and an enlarged inner portion adapted to fit within the notch of the free end, the pin being movable in the bore transversely into the channel from a normal position in which the enlarged inner portion is within the channel to a retracted position in which only the narrow outer portion is within the channel.

* * * * *

UNITED STATES PATENT AND TRADEMARK OFFICE
CERTIFICATE OF CORRECTION

PATENT NO. : 5,197,644
DATED : March 30, 1993
INVENTOR(S) : Jack J. Gillett and John A. Outten It is certified that error appears in the above-identified patent and that said Letters Patent is hereby corrected as shown below:

Col. 8, ln. 11: rollers 3 (should be) rollers 30

Col. 8, ln. 38: 32 o (should be) 32 on

Col. 11, ln. 7: film 2 (should be) film 24

Col. 13, ln. 40: normal portion (should be) normal position

Col. 15, ln. 20: adjustable f--m (should be) adjustable film

Signed and Sealed this

Twenty-third Day of November, 1993

Attest:

BRUCE LEHMAN

Attesting Officer

Commissioner of Patents and Trademarks